US012677992B2

(12) United States Patent
Cattes et al.

(10) Patent No.: US 12,677,992 B2
(45) Date of Patent: Jul. 14, 2026

(54) MULTI-POSITION BLENDER

(71) Applicant: WHIRLPOOL CORPORATION, Benton Harbor, MI (US)

(72) Inventors: Brandon Wayne Cattes, Benton Harbor, MI (US); Kathryn Elizabeth D'Alessandro, Saint Joseph, MI (US); Timothy Eric Heater, Hartford, MI (US); Andrew John Leitert, Eau Claire, MI (US); Jeremy Todd Wolters, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 585 days.

(21) Appl. No.: 18/137,558

(22) Filed: Apr. 21, 2023

(65) Prior Publication Data

US 2024/0349948 A1      Oct. 24, 2024

(51) Int. Cl.
*A47J 43/00* (2006.01)
*A47J 43/046* (2006.01)
*A47J 43/07* (2006.01)

(52) U.S. Cl.
CPC ......... *A47J 43/0716* (2013.01); *A47J 43/046* (2013.01)

(58) Field of Classification Search
CPC .... A47J 43/0716; A47J 43/046; A47J 43/085; A47J 43/08; A47J 43/0766
See application file for complete search history.

(56) References Cited

U.S. PATENT DOCUMENTS

| | | | |
|---|---|---|---|
| 8,674,941 B2 | 3/2014 | Casparian et al. | |
| 9,398,911 B2 | 7/2016 | Auld | |
| 9,815,037 B2 | 11/2017 | Brotzki et al. | |
| 10,058,031 B1 | 8/2018 | Brown et al. | |
| 11,266,271 B2 | 3/2022 | Krivos et al. | |
| 2013/0043337 A1 | 2/2013 | Rukavina et al. | |
| 2015/0117137 A1 | 4/2015 | Haney et al. | |
| 2018/0271322 A1 | 9/2018 | Thai et al. | |
| 2020/0229648 A1* | 7/2020 | Kettavong | A47J 43/0716 |

FOREIGN PATENT DOCUMENTS

| | | | | |
|---|---|---|---|---|
| FR | 2464047 A1 | 3/1981 | | |
| FR | 2488038 A1 | 2/1982 | | |
| WO | 2007023116 A1 | 3/2007 | | |
| WO | WO-2022207237 A1 * | 10/2022 | | A47J 43/046 |

* cited by examiner

*Primary Examiner* — Anshu Bhatia
(74) *Attorney, Agent, or Firm* — Price Heneveld LLP

(57) ABSTRACT

A blender includes a base. The blender further includes a sensor disposed in the base. The blender further includes a container selectively coupled with the base in a first rotational position and in a second rotational position. The container has an upper portion and a lower portion. The blender further includes a lid selectively engaging the upper portion of the container. The blender further includes a carrier in the lower portion and extending between a first end and a second end. The carrier includes a first magnet disposed proximate the first end. The carrier further includes a second magnet disposed proximate the second end. The sensor is configured to detect the first magnet in the first rotational position and the second magnet in the second rotational position.

20 Claims, 7 Drawing Sheets

MULTI-POSITION BLENDER

BACKGROUND OF THE DISCLOSURE

The present disclosure generally relates to a multi-position blender, more particularly, to a blender having a container with a right-hand orientation and a left-hand orientation relative to a base of the blender.

SUMMARY OF THE DISCLOSURE

According to one aspect of the present disclosure, a blender includes a base. The blender further includes a sensor disposed in the base. The blender further includes a container selectively coupled with the base in a first rotational position and in a second rotational position. The container has an upper portion and a lower portion. The blender further includes a lid selectively engaging the upper portion of the container. The blender further includes a carrier in the lower portion and extending between a first end and a second end. The carrier includes a first magnet disposed proximate the first end. The carrier further includes a second magnet disposed proximate the second end. The sensor is configured to detect the first magnet in the first rotational position and the second magnet in the second rotational position.

According to another aspect of the present disclosure, a blender includes a base and a sensor disposed in the base. The blender further includes a container selectively coupled with the base in a first rotational position and in a second rotational position. The blender further includes a carrier extending between a first end and a second end. A first magnet is disposed proximate the first end. A second magnet is disposed proximate the second end. The sensor is configured to detect the first magnet in the first rotational position and the second magnet in the second rotational position.

According to yet another aspect of the present disclosure, a blender includes a base and a reed switch disposed in the base. A container selectively couples with the base in a first rotational position and in a second rotational position. The container has an upper portion and a lower portion. A lid selectively engages the upper portion of the container. A handle is operable to move the container relative to the base. The first rotational position corresponds to a right-hand orientation of the handle and the second rotational position corresponds to a left-hand orientation of the handle. A carrier is in the lower portion and extending between a first end and a second end. The carrier includes a first magnet disposed proximate the first end and a second magnet disposed proximate the second end. The sensor is configured to detect the first magnet in the first rotational position and the second magnet in the second rotational position. The carrier further includes an elongated body between the first end and the second end to allow the first magnet to align with the sensor in the right-hand orientation and to allow the second magnet to align with the sensor in the left-hand orientation.

These and other features, advantages, and objects of the present disclosure will be further understood and appreciated by those skilled in the art by reference to the following specification, claims, and appended drawings.

Figure 1:
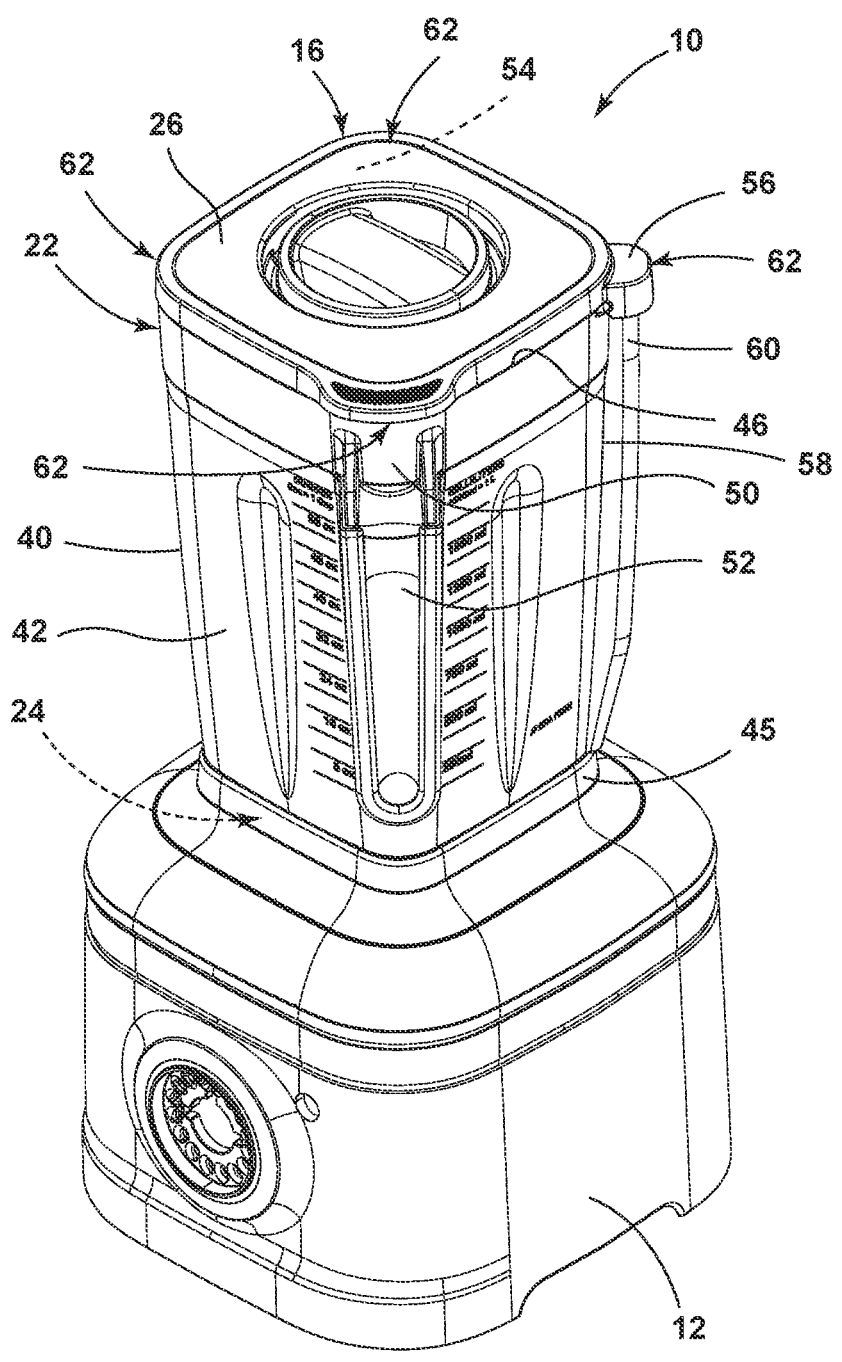
FIG. 1 is a top perspective view of a blender according to one aspect of the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a multi-position blender. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-7B, reference numeral 10 generally designates a blender 10. The blender 10 includes a base 12 and a sensor 14 disposed in the base 12. The blender 10 further includes a container 16 selectively coupled with the base 12 in a first rotational position 18 and in a second rotational position 20. The container 16 has an upper portion 22 and a lower portion 24. A lid 26 selectively engages the upper portion 22 of the container 16. The blender 10 further includes a carrier 30 in the lower portion 24. The carrier 30 extends between a first end 32 and a second end 34. The carrier 30 includes a first magnet 36 disposed proximate the first end 32 and a second magnet 38 disposed proximate the second end 34. The sensor 14 is configured to detect the first magnet 36 in the first rotational position 18 and the second magnet 38 in the second rotational position 20. The blender 10 may be any food processing apparatus operable to mix food items and/or liquefy, chop, cure, or otherwise process food items.

Figure 2:
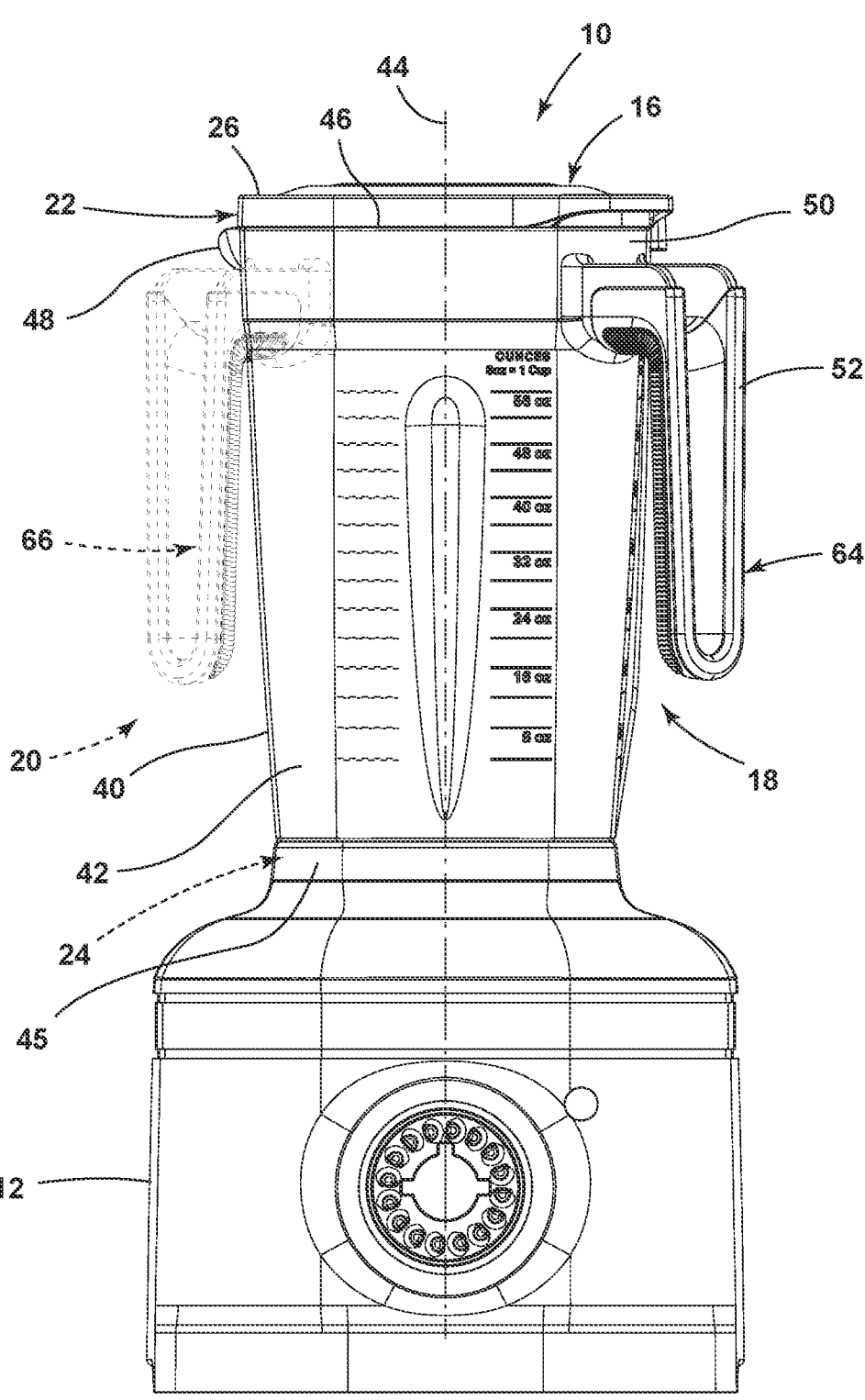
FIG. 2 is a front plan view of the blender of FIG. 1 demonstrating a right-hand orientation of a container handle of the blender and a left-hand orientation of the container handle of the blender in phantom.

Referring now to FIGS. 1 and 2, the container 16 includes a jar 40 having a sidewall 42 that extends between the upper portion 22 and the lower portion 24 of the container 16. The jar 40 may be optically transmissive to allow a user using the blender 10 to view contents of the container 16. The sidewall 42 extends along a central axis 44 of the container 16 which aligns with a motor in the base 12 that is configured to rotate food processing mechanisms, such as blades, about the central axis 44. For example, the motor may be mounted to an interface 45, or jar pad, of the base 12 for releasably coupling the container 16 with the base 12. The sidewall 42 forms a rim 46 at the upper portion 22 of the container 16 that is configured to interact with the lid 26. For example, the lid 26 may have a sealed fit with the sidewall 42 at the rim 46 to seal an interior of the container 16. It is contemplated that other connections between the lid 26 and the rim 46, such as a hinged connection, a threaded connection, or any other selective connection may be incorporated by the blender 10.

With continued reference to FIGS. 1 and 2, the rim 46 further forms a spout 48 disposed on a first side 50 the container 16 for pouring contents out of the interior. A handle 52 extends from the sidewall 42 at a second side 54 of the container 16, opposite the first side 50, to allow the user to manipulate the container 16 when pouring contents out of the spout 48 or when removing or placing the container 16 from/on the base 12. The lid 26 may further include a projection 56 that extends from a third side 58 of the container 16 at the rim 46 and covers a casing 60 coupled with the sidewall 42. As will be described further herein, the projection 56 may interact with the carrier 30 in the lower portion 24. The third side 58 may be disposed between the first and second sides 50, 54 of the container 16. For example, the third side 58 may be disposed at one corner 62 of the container 16 in examples in which the container 16 forms a generally square-shaped cross-section of the sidewall 42. In this example, the handle 52 and the spout 48 are also disposed at corners 62 of the container 16. The cross-sectional shape of the sidewall 42 is merely exemplary, and it is contemplated that other polygonal and/or arcuate-shaped cross-sections may be by the container 16 of the present disclosure.

Referring now more particularly to FIG. 2, the handle 52 may be operable to move the container 16 relative to the base 12. For example, the container 16 may be lifted from the base 12 via the handle 52. When placing the container 16 on the base 12, the user may place the container 16 in a right-hand orientation 64 or a left-hand orientation 66 of the handle 52. The first rotational position 18 of the container 16 corresponds with the right-hand orientation 64 of the handle 52, and the second rotational position 20 of the container 16 corresponds to the left-hand orientation 66 of the handle 52. By providing for multiple positions to position the container 16 on the base 12, the present blender 10 may provide for enhanced usability while maintaining functional connection between the lid 26 and the carrier 30 in the lower portion 24. In some examples, the jar 40 is keyed with the base 12 to provide limited orientations of the jar 40 relative to the base 12.

Figure 3:
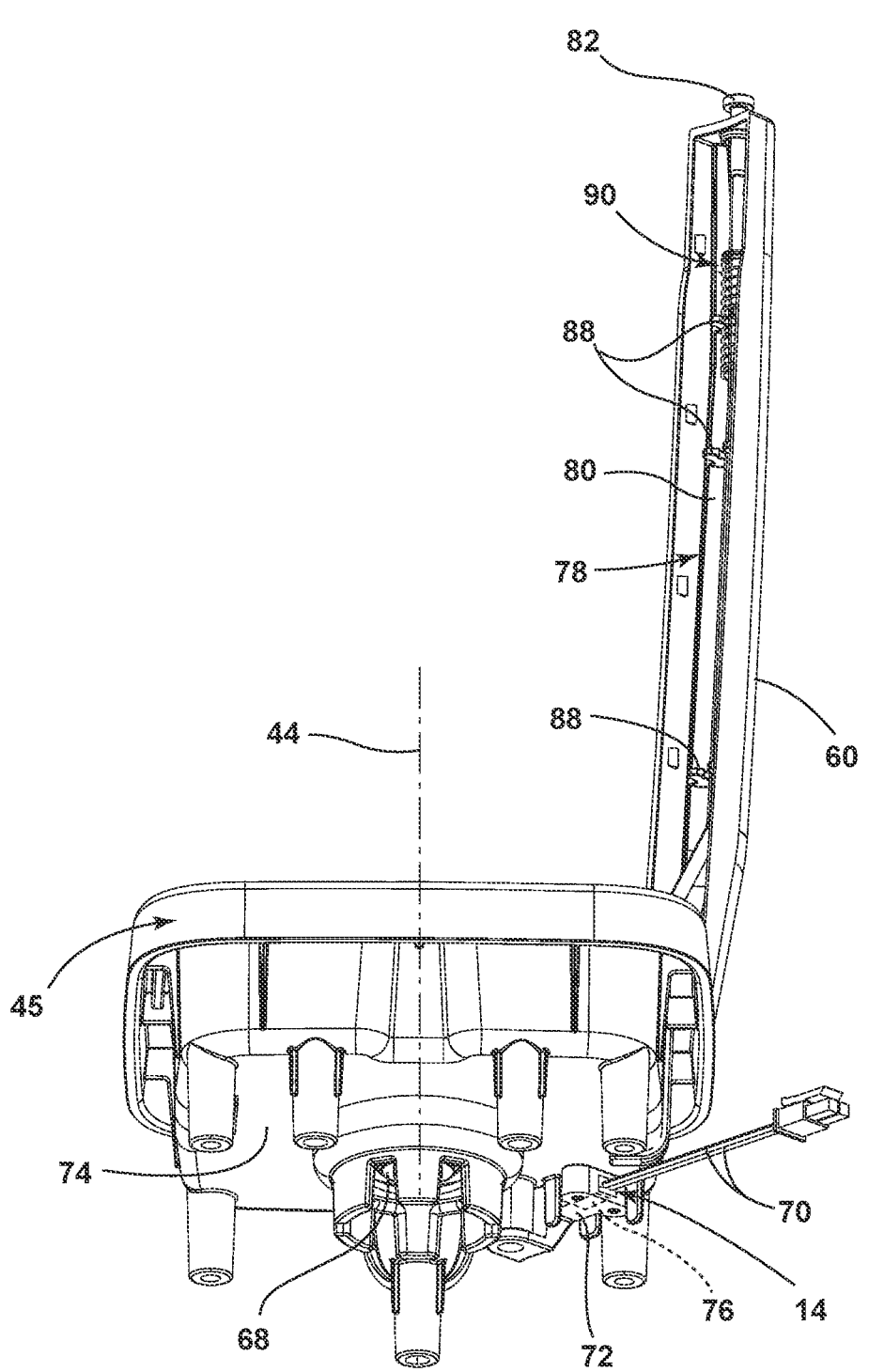
FIG. 3 is a bottom perspective view of the blender of FIG. 1 having a jar, at least a portion of a base, and a casing of the blender removed revealing an underside of an interface and a rod of the blender.

Referring now to FIG. 3, a mount for a motor is provided along the central axis 44 in the underside of the interface 45 and is configured to allow the motor to drive the food processing mechanisms through a central aperture 68 in the lower portion 24. The sensor 14 may be disposed adjacent the mount in the underside of the interface 45 and include electrical conductors, or wires 70, extending into a holder 72 of the sensor 14. The holder 72 may be directly coupled to a bottom surface 74 of the interface 45 and include a reed switch 76 that is configured to detect a magnetic field from the first and second magnets 36, 38. It is contemplated that, although the sensor 14 is illustrated as being the reed switch 76 actuatable upon detection of the magnetic field, the sensor 14 may employ more or less sophisticated sensing devices. For example, the sensor 14 may incorporate a Hall-effect sensor 14 or multiple reed switches 76 placed at different distances from the carrier 30 to allow the sensor 14 to detect a strength of the magnetic field applied to the sensor 14. In such an example, the first magnet 36 may have a first magnetic field and the second magnet 38 may have a second magnetic field that is weaker or stronger in magnitude than the first magnetic field, and the sensor 14 may provide a signal indicating which of the orientations the container 16 is in. Accordingly, the sensor 14 may be configured to differentiate between left-hand and right-hand orientations 64, 66 in some examples.

Still referring to FIG. 3, the sensor 14 may be disposed adjacent to the third side 58 near the casing 60 of the rod 80. In operation, the sensor 14 may be configured to align with one of the first magnet 36 and the second magnet 38 depending on the left-hand or right-hand orientations 64, 66 of the handle 52. For example, the first and second magnet 36, 38 may be operable to align with the sensor 14 in a direction parallel to the central axis 44. Stated differently, the first and second magnet 36, 38 may vertically align with the sensor 14 depending on the orientation of the handle 52.

Figure 4:
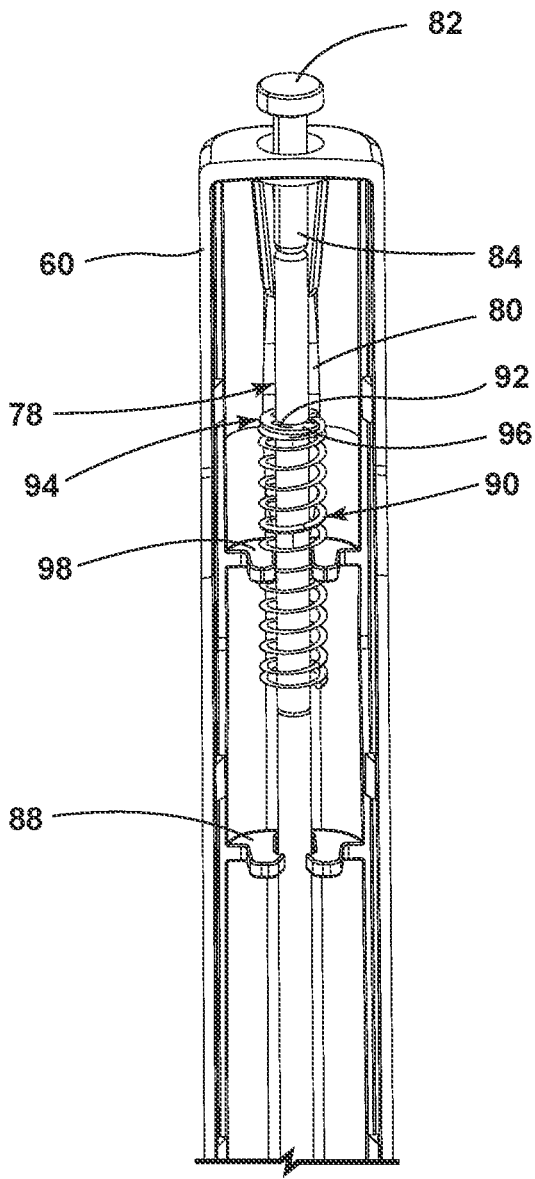
FIG. 4 is a detailed view of an upper portion of the casing housing the rod shown in FIG. 3.

Referring now to FIGS. 3 and 4, a transmission mechanism 78, such as a rod 80, extends between the lid 26 and the carrier 30 (FIGS. 5-7B). The rod 80 is movable between an upward position and a downward position. Engagement of the lid 26 with the upper portion 22 to cover the container 16 moves the rod 80 toward the downward position. For example, a plunger 82 may mechanically interpose the lid 26 and the rod 80. The lid 26 covering the container 16 moves the rod 80 toward the downward position. The rod 80 extends between an upper end 84 and a lower end 86. As will be described further herein, the lower end 86 mates with, or engages, the carrier 30, such that movement of the rod 80 causes movement of the carrier 30. The casing 60 is disposed around the rod 80 between the lower portion 24 and the lid 26 and may encase the rod 80 and provide one or more stabilizers 88 for the rod 80 to allow translation of the rod 80 between the upward and downward positions. The stabilizer 88 may guide the rod 80 through the casing 60 and limit lateral movement of the rod 80 to maintain alignment of the rod 80 in the casing 60.

Referring more particularly to FIG. 4, a biasing member 90 extends between the casing 60 and the rod 80. The biasing member 90 is configured to bias the rod 80 toward the upward position. For example, the rod 80 may define a groove 92 extending radially inwardly and receiving a clasp 94 that is axially locked with the rod 80. The clasp 94 may include a disc 96 that locks in the groove 92. The biasing member 90, which may be a first spring 98, is sandwiched between the clasp 94 and one of the stabilizers 88 of the casing 60. An expansion force caused by the coiled spring may cause the bias of the rod 80 toward the upward position. When the lid 26 is secured to the container 16 at the upper portion 22, the plunger 82 interposing the lid 26 and the rod 80 at the upper end 84 drives the rod 80 through the casing 60. In this way, the force of the lid 26 on the plunger 82 (e.g., a sealing force with the rim 46, a locking force of a threaded connection, gravity, etc.) drives the rod 80 downward in response to interaction with the lid 26 to overcome the bias and push the carrier 30 toward the base 12. For example, the projection 56 may engage the plunger 82 to push the upper end 84 of the rod 80 downward and overcome the bias toward the upward position. Thus, upon securing the lid 26 with the rim 46 of the container 16, the rod 80 is translated downwardly to cause the carrier 30 to be translated downwardly toward the base 12.

Figure 5:
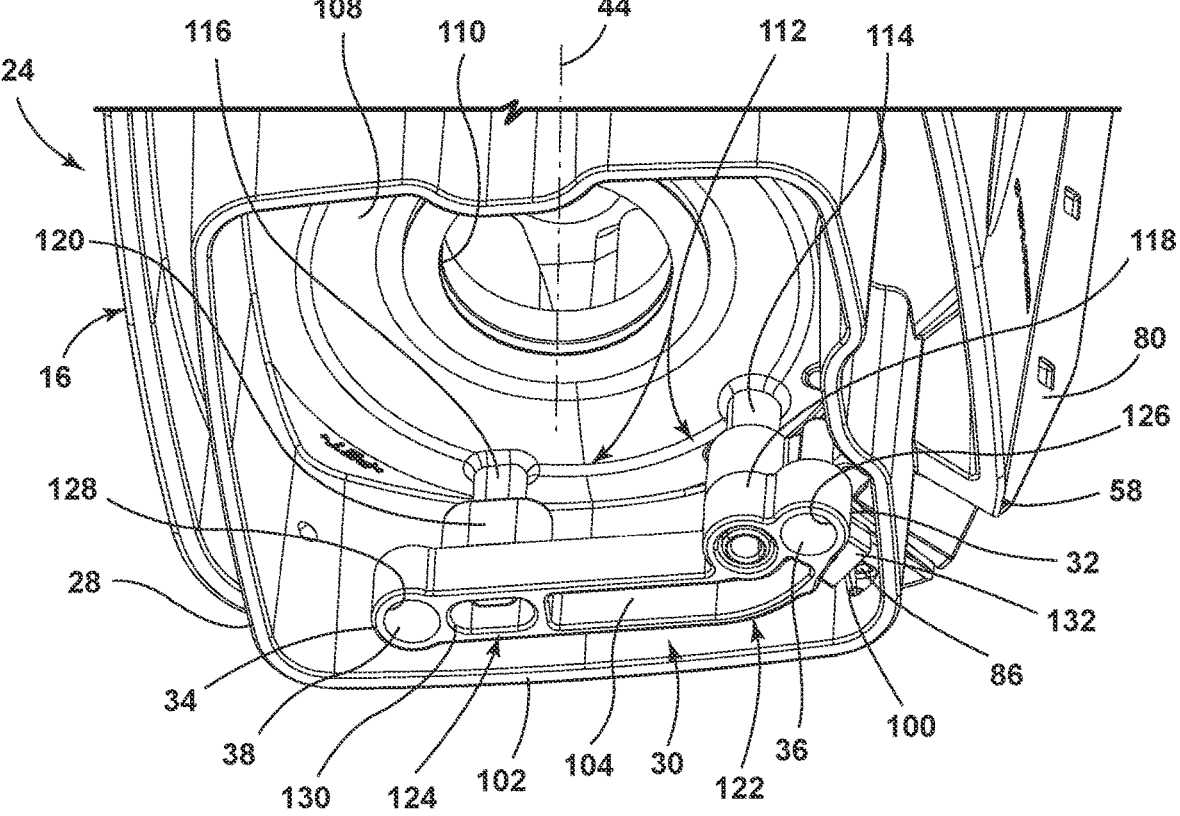
FIG. 5 is a partial bottom perspective view of a container interacting with a carrier of a blender.
Figure 6:
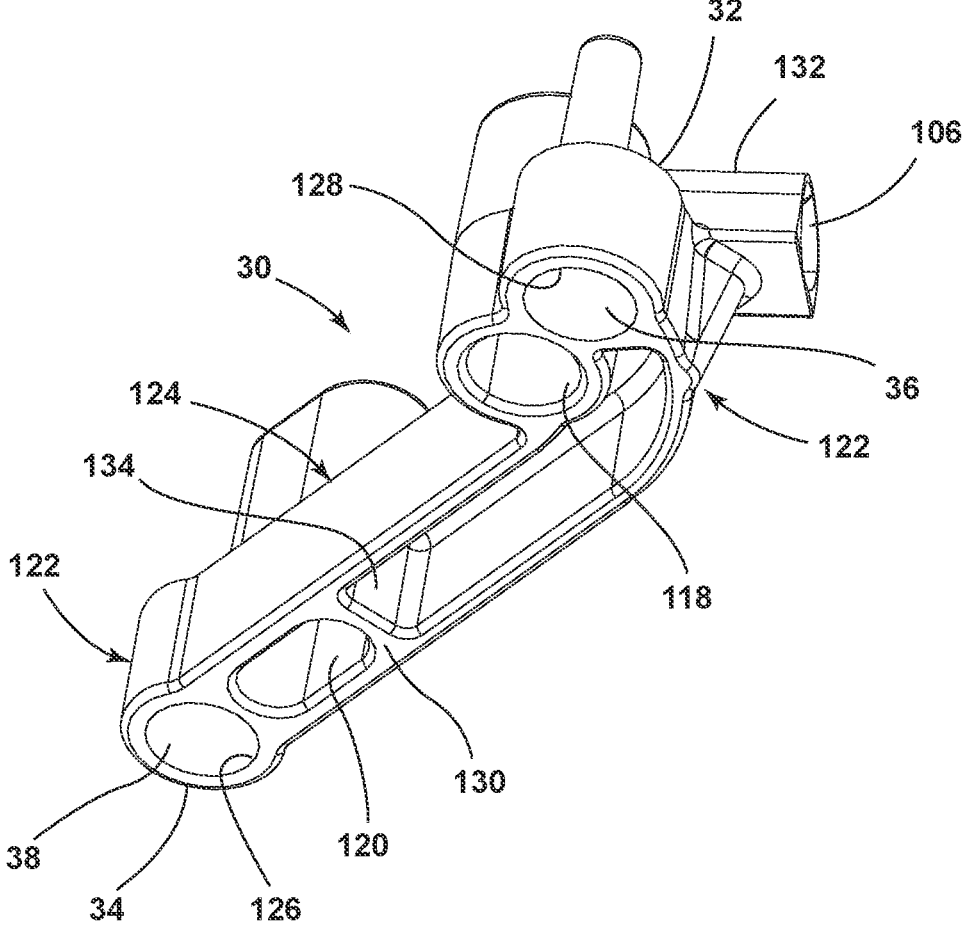
FIG. 6 is a bottom perspective view of an exemplary carrier for a blender according to one example of the present disclosure.

Referring now to FIGS. 5 and 6, the rod 80 may extend into the lower portion 24 at the lower end 86 via a hole 100 defined by a collar 102 of the lower portion 24. The hole 100 may have an elongated shape to allow upward and downward movement of the rod 80 in the lower portion 24. For example, as illustrated, the hole 100 may be oblong- or oval-shaped with a long axis of the oval/oblong shape extending vertically/parallel with the central axis 44. As shown in FIG. 6, the carrier 30 includes an elongated body 104 that defines a slot 106 configured to receive the rod 80. Moving of the rod 80 toward the downward position is operable to push the carrier 30 for the sensor 14. For example, as the rod 80 translates vertically, the carrier 30 may also translate vertically to move the magnets 36, 38 closer to or further from the base 12 and the sensor 14. Thus, when the first or second magnet 38 is aligned with the sensor 14, the sensor 14 may be limited from detecting the magnetic field caused by the magnets 36, 38 in response to the rod 80 being in the upward position. Likewise, the sensor 14 may be operable to detect the magnetic field of the first or the second magnet 36, 38 in response to the rod 80 being in the downward position and the handle 52 being in the left-hand orientation 66 or the right-hand orientation 64.

Referring more particularly now to FIG. 5, the jar 40 includes a lower wall 108 that defines a cavity 110 configured to receive the food processing mechanisms in the interior and allow mechanical coupling of the food processing mechanisms with the motor and/or a mechanical interface between the food processing mechanisms and the motor. A mating connection 112 between the lower wall 108 of the jar 40 and the carrier 30 is formed via at least one male connector 114, 116 and at least one female connector 118, 120 between the lower wall 108 and the carrier 30. In the illustrated example, the at least one male connector 114, 116 includes a first male connector 114 and a second male connector 116, each extending downwardly from the lower wall 108 and engaging a first female connector 118 and a second female connector 120 formed on the carrier 30, respectively. For example, the first female connector 118 may be formed proximate to the first end 32 of the carrier 30, and the second female connector 120 may be formed adjacent the second end 34 of the carrier 30. The mating connection 112 may be a keyed connection, such that only a specific arrangement or configuration between the jar 40 and the carrier 30 may be achieved during assembly of the container 16. Stated differently, the male and female connectors 118, 120 are keyed to prevent misassembly of the carrier 30 into the lower portion 24 of the jar 40. For example, the first male and female connectors 114, 118 may have a circular-shaped cross-section, whereas the second male and female connectors 116, 120 may have an oblong or irregularly shaped cross-section. In this way, connection between the jar 40 and the base 12 may be guided to limit improper assembly.

Although illustrated as a having an arcuate portion 122 and a straight portion 124 of the elongated body 104, it is contemplated that any arcuate or straight shape of the elongated body 104 may be formed by the carrier 30. It is further contemplated that, while the two magnets 36, 38 are incorporated to demonstrate the left-hand and right-hand orientations 64, 66, any plurality of magnets 36, 38 may be provided in the carrier 30 without deviating from the present disclosure. For example, three positions may be achievable by using three magnets 36, 38 in the carrier 30 and having three acceptable orientations for the handle 52. In some examples, the first and second rotational positions 18, 20 of the container 16 are between 90° and 180° from one another relative to the central axis 44 of the container 16. However, it is contemplated that other rotational positions for the blender 10 may be anticipated by the present disclosure.

Referring again to FIGS. 5 and 6, the carrier 30 defines a first hollow 126 proximate the first end 32 and receiving the first magnet 36. The carrier 30 further defines a second hollow 128 proximate the second end 34 receiving the second magnet 38. For example, the hollow may be cylindrically- or tubularly-shaped and extend into an interacting face 130 of the carrier 30. An adhesive, or another bonding member, may be deposited in one or both behind the corresponding first magnet 36 or second magnet 38. For example, the first and second magnet 36, 38 may be disc 96-shaped and the adhesive, or other bonding member, may be disposed behind the magnets 36, 38 to secure the magnets 36, 38 with the elongated body 104. An outer surface of the magnet 36,38 may be flush or substantially flush with the interacting face 130 of the carrier 30. However, as will be described further herein, other components may be incorporated in each hollow 126, 128 to allow for adjustable movement of the magnet 36, 38 relative to the elongated body 104.

Figure 7A:
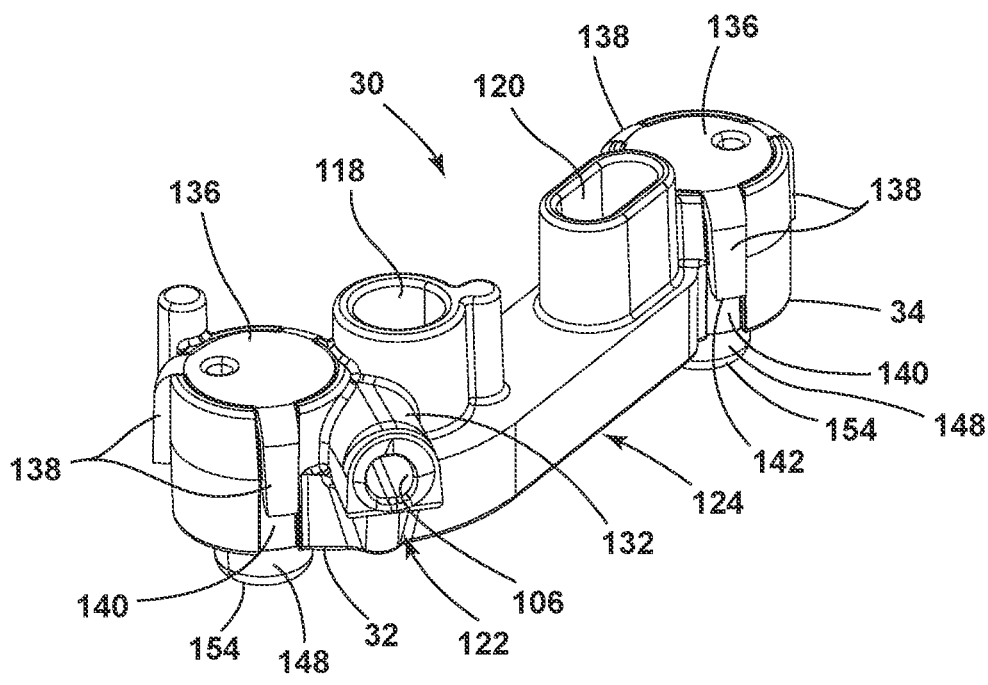
FIG. 7A is a top perspective view of another exemplary carrier for a blender according to one example of the present disclosure.
Figure 7B:
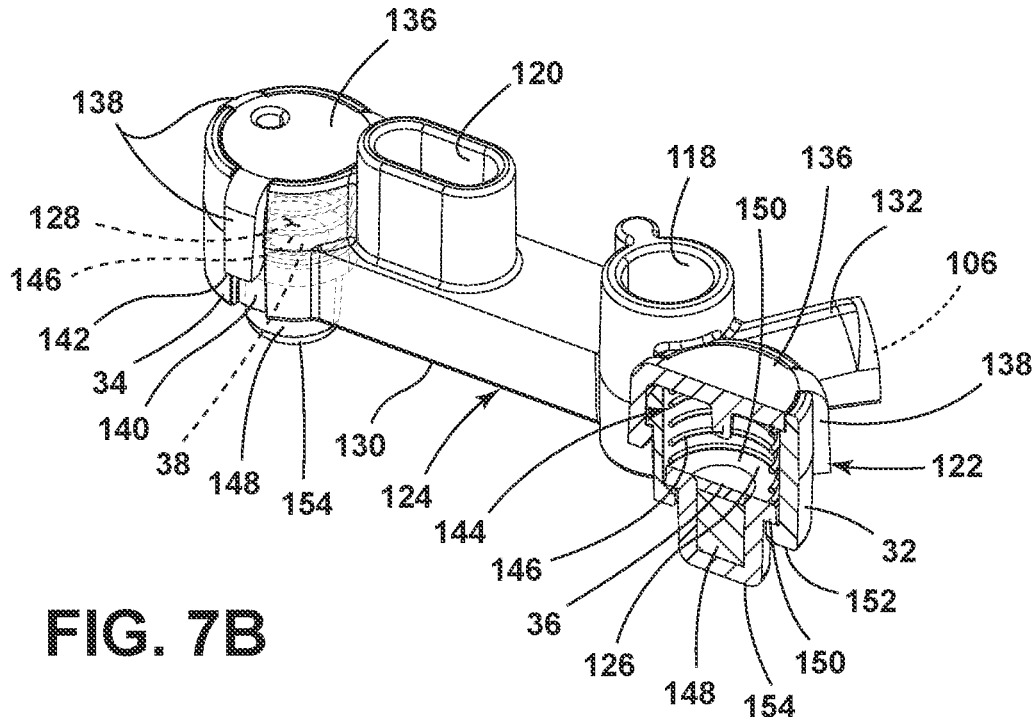
FIG. 7B is a top perspective view of the carrier shown in FIG. 7A having a partial cross-sectional view of a hollow of the carrier.

Referring now to FIGS. 6-7B, the slot 106 defined by the elongated body 104 may extend along a protrusion 132 substantially perpendicular to the central axis 44 of the container 16. Accordingly, the lower end 86 of the rod 80 may also extend substantially orthogonally relative the second axis to engage the slot 106 and link with the carrier 30. It is contemplated that the stabilizers 88 of the casing 60 previously described may maintain lateral securement of the rod 80 to limit lateral movement of the rod 80 and thereby limit the rod 80 from becoming detached with the slot 106.

As demonstrated particularly in FIG. 6, the elongated body 104 may include a rib 134 extending between two rails of the elongated body 104. The rib 134 may provide for structural rigidity between the first end 32 and the second end 34 of the carrier 30. For example, when the rod 80 translates vertically, each end of the carrier 30 may translate with cantilever support from the first end 32 due to the structural rigidity of the elongated body 104 provided by the rib 134.

Referring now more particularly to FIGS. 7A and 7B, a cap 136 may be disposed proximate each of the first end 32 and the second end 34 and may cover the first and second hollows 126, 128 above the first and second magnets 36, 38.

Each cap 136 may be fastened with the elongated body 104 via one or more fasteners 138 that are operable to engage the elongated body 104. For example, one or more notches 140 may be defined by the elongated body 104 and be configured to mate with the one or more fasteners 138 to provide a snap-fit connection between the cap 136 and the elongated body 104. The one or more fasteners 138 may include hooks 142 that engage the one or more notches 140 and limit removal and/or rotation of the caps relative to the elongated body 104.

Still referring to FIGS. 7A and 7B, a resilient member 144, such as a second spring 146, may be disposed in each hollow 126, 128 and configured to bias the corresponding first or second magnet 36, 38 away from the elongated body 104. For example, a tubular member 148 in which the magnets 36, 38 are disposed may be moveable in the hollow 126, 128 between a retracted position and an extended position. The tubular member 148 may include a flange 150 configured to engage a ledge 152 of the hollow 126, 128 in the extended position. The resilient member 144 may push against the tubular member 148 to bias the tubular member 148 in the extended position. For example, the tubular member 148 may have a T-shaped cross-section that inter-acts with the hollow 126, 128 to allow for movement between the extended and retracted positions. The ledge 152 may limit an entirety of the tubular member 148 from moving out of the hollow 126, 128. For example, because the resilient member 144 is sandwiched between the tubular member 148 and the cap 136, an expansion force of the resilient member 144 pushes the tubular member 148 down-wardly from the cap 136. However, due to an interaction between the flange 150 and the ledge 152, the tubular member 148 may remain within the hollow 126, 128.

In operation, when the lid 26 is placed on the container 16, the rod 80 translates downwardly causing the carrier 30, along with the tubular members 148, to translate down-wardly toward the base 12. A bottom end 154 of the tubular member 148 may contact and engage the base 12, thereby causing the tubular members 148 to move into the hollow 126, 128 and overcome the expansion force of the resilient member 144. The magnet 36, 38 that is positioned over the sensor 14 may thereby flag the sensor 14 base 12 on the magnetic field. By providing the movable tubular member 148, and therefore movable magnets 36, 38, a more flexible solution may be provided.

In general, the present blender 10 may provide for dynamic and flexible usage without requiring enhanced manufacturing tolerances. For example, deviation from an expected movement of the lid 26, the rod 80, the carrier 30, or the magnets 36, 38, may nonetheless result in the sensor 14 properly detecting attachment of the lid 26 to the rim 46. By incorporating the various biasing member 90 and resil-ient members 144, false readings by the sensor 14 may be limited, and proper detection of the right-hand or left-hand orientations 64, 66 may be achieved by the blender 10 of the present disclosure.

According to an aspect of the present disclosure, a blender includes a base. The blender further includes a sensor disposed in the base. The blender further includes a con-tainer selectively coupled with the base in a first rotational position and in a second rotational position. The container has an upper portion and a lower portion. The blender further includes a lid that selectively engages the upper portion of the container. The blender further includes a carrier in the lower portion that extends between a first end and a second end. The carrier includes a first magnet disposed proximate the first end. The carrier further includes a second magnet disposed proximate the second end. The sensor is configured to detect the first magnet in the first rotational position and the second magnet in the second rotational position.

According to another aspect of the present disclosure, the blender includes a rod extending between the lid and the carrier. The rod is moveable between an upward position and a downward position. The lid engaging the upper portion of the container moves the rod toward the downward position.

According to yet another aspect of the present disclosure, the blender includes an elongated body that defines a slot configured to receive the rod. The moving of the rod toward the downward position is operable to push the carrier toward the sensor.

According to another aspect of the present disclosure, the sensor is limited from detecting a magnetic field of the first and second magnets in response to the rod being in the upward position.

According to yet another aspect of the present disclosure, the carrier defines a first hollow proximate the first end and receiving the first magnet and a second hollow proximate the second end and receiving the second magnet.

According to another aspect of the present disclosure, the blender further includes a resilient member disposed in the first hollow configured to bias the first magnet away from the elongated body.

According to yet another aspect of the present disclosure, the blender further includes a tubular member moveable in the first hollow and holding the first magnet.

According to another aspect of the present disclosure, the tubular member is configured to engage the base in response to the bias of the first magnet away from the elongated body.

According to yet another aspect of the present disclosure, the blender further includes a cap disposed proximate each of the first end and the second end and covering the first and second hollows above the first and second magnets.

According to another aspect of the present disclosure, the resilient member is sandwiched between the tubular member and the cap.

According to yet another aspect of the present disclosure, the blender further includes a casing disposed around the rod between the lower portion and the lid. The blender further includes a biasing member extending between the casing and the rod and configured to bias the rod toward the upward position.

According to another aspect of the present disclosure, the blender further includes a plunger mechanically interposing the lid and the rod and configured to drive the rod through the casing when the lid is secured at the upper portion.

According to yet another aspect of the present disclosure, the sensor is a reed switch.

According to yet another aspect of the present disclosure, the blender further includes a handle operable to move the container relative to the base. The first rotational position corresponds to a right-hand orientation of the handle and the second rotational position corresponds to a left-hand orien-tation of the handle.

According to another aspect of the present disclosure, the carrier has an elongated body between the first end and the second end to allow the first magnet to align with the sensor in the right-hand orientation and to allow the second magnet to align with the sensor in the left-hand orientation.

According to yet another aspect of the present disclosure, a blender includes a base and a sensor disposed in the base. The blender further includes a container selectively coupled with the base in a first rotational position and in a second rotational position. The blender further includes a carrier extending between a first end and a second end. A first magnet is disposed proximate the first end. A second magnet is disposed proximate the second end. The sensor is configured to detect the first magnet in the first rotational position and the second magnet in the second rotational position.

According to another aspect of the present disclosure, the blender further includes a handle for moving the container relative to the base. The first rotational position corresponds to a right-hand orientation of the handle and the second rotational position corresponds to a left-hand orientation of the handle.

According to yet another aspect of the present disclosure, the carrier has an elongated body between the first end and the second end to allow the first magnet to align with the sensor in the right-hand orientation and to allow the second magnet to align with the sensor in the left-hand orientation.

According to another aspect of the present disclosure, the blender further includes a rod extending between the lid and the carrier. The rod is moveable between an upward position and a downward position. The lid engaging the upper portion of the container moves the rod toward the downward position.

According to yet another aspect of the present disclosure, a blender includes a base and a reed switch disposed in the base. A container selectively couples with the base in a first rotational position and in a second rotational position. The container has an upper portion and a lower portion. A lid selectively engages the upper portion of the container. A handle is operable to move the container relative to the base. The first rotational position corresponds to a right-hand orientation of the handle and the second rotational position corresponds to a left-hand orientation of the handle. A carrier is in the lower portion and extends between a first end and a second end. The carrier includes a first magnet disposed proximate the first end and a second magnet disposed proximate the second end. The sensor is configured to detect the first magnet in the first rotational position and the second magnet in the second rotational position. The carrier further includes an elongated body between the first end and the second end to allow the first magnet to align with the sensor in the right-hand orientation and to allow the second magnet to align with the sensor in the left-hand orientation.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A blender comprising:
   a base;
   a sensor disposed in the base;
   a container selectively coupled with the base in a first rotational position and in a second rotational position, the container having an upper portion and a lower portion;
   a lid selectively engaging the upper portion of the container;
   a carrier in the lower portion and extending between a first end and a second end, the carrier including:
   a first magnet disposed proximate the first end; and
   a second magnet disposed proximate the second end, wherein the sensor is configured to detect the first magnet in the first rotational position and the second magnet in the second rotational position; and
   a rod extending between the lid and the carrier, the rod movable between an upward and a downward position, wherein the lid moves the rod toward the downward position, wherein the carrier includes an elongated body that defines a slot configured to receive the rod, and wherein the moving of the rod toward the downward position is operable to move the carrier toward the sensor.

2. The blender of claim 1, wherein the sensor is limited from detecting a magnetic field of the first and second magnets in response to the rod being in the upward position.

3. The blender of claim 1, wherein the carrier defines a first hollow proximate the first end and receiving the first magnet and a second hollow proximate the second end and receiving the second magnet.

4. The blender of claim 3, further comprising:
   a resilient member disposed in the first hollow configured to bias the first magnet away from the elongated body.

5. The blender of claim 4, further comprising:
   a tubular member moveable in the first hollow and holding the first magnet.

6. The blender of claim 5, wherein the tubular member is configured to engage the base in response to the bias of the first magnet away from the elongated body.

7. The blender of claim 6, further comprising:
a cap disposed proximate each of the first end and the second end and covering the first and second hollows above the first and second magnets.

8. The blender of claim 7, wherein the resilient member is sandwiched between the tubular member and the cap.

9. The blender of claim 1, further comprising:
a casing disposed around the rod between the lower portion and the lid; and
a biasing member extending between the casing and the rod and configured to bias the rod toward the upward position.

10. The blender of claim 9, further comprising:
a plunger mechanically interposing the lid and the rod to drive the rod through the casing when the lid is secured at the upper portion.

11. The blender of claim 10, wherein the casing includes one or more stabilizers to allow translation of the rod between the upward and downward positions.

12. The blender of claim 1, wherein the sensor is a reed switch.

13. The blender of claim 1, further comprising:
a handle operable to move the container relative to the base, wherein the first rotational position corresponds to a right-hand orientation of the handle and the second rotational position corresponds to a left-hand orientation of the handle.

14. The blender of claim 13, wherein the carrier extending between the first end and the second end allows the first magnet to align with the sensor in the right-hand orientation and to allow the second magnet to align with the sensor in the left-hand orientation.

15. A blender comprising:
a base;
a lid;
a sensor disposed in the base;
a container selectively coupled with the base in a first rotational position and in a second rotational position;
a carrier extending between a first end and a second end;
a rod extending between the lid and the carrier, wherein the rod is movable toward a downward position, and wherein movement of the rod toward the downward position operates the carrier toward the sensor;
a first magnet disposed proximate the first end; and
a second magnet disposed proximate the second end, wherein the sensor is configured to detect the first magnet in the first rotational position and the second magnet in the second rotational position.

16. The blender of claim 15, wherein the carrier defines a slot configured to receive the rod.

17. The blender of claim 15, wherein the lid is operable to move the rod toward the downward position.

18. The blender of claim 15, further comprising:
a handle for moving the container relative to the base, wherein the first rotational position corresponds to a right-hand orientation of the handle and the second rotational position corresponds to a left-hand orientation of the handle.

19. The blender of claim 18, wherein the carrier has an elongated body between the first end and the second end to allow the first magnet to align with the sensor in the right-hand orientation and to allow the second magnet to align with the sensor in the left-hand orientation.

20. A blender comprising:
a base;
a reed switch disposed in the base;
a container selectively coupled with the base in a first rotational position and in a second rotational position, the container having an upper portion and a lower portion;
a lid selectively engaging the upper portion of the container;
a handle operable to move the container relative to the base, wherein the first rotational position corresponds to a right-hand orientation of the handle and the second rotational position corresponds to a left-hand orientation of the handle; and
a carrier in the lower portion and extending between a first end and a second end, the carrier including:
a rod operably coupling the lid to the carrier, wherein the lid moves the rod toward a downward position, and wherein movement of the rod toward the downward position actuates the carrier toward the reed switch;
a first magnet disposed proximate the first end;
a second magnet disposed proximate the second end, wherein the reed switch is configured to detect the first magnet in the first rotational position and the second magnet in the second rotational position; and
an elongated body between the first end and the second end to allow the first magnet to align with a sensor in the right-hand orientation and to allow the second magnet to align with the sensor in the left-hand orientation.

* * * * *